(12) United States Patent
Martin

(10) Patent No.: US 7,028,641 B1
(45) Date of Patent: Apr. 18, 2006

(54) SPRING-LOADED ANIMAL TETHER ASSEMBLY

(76) Inventor: James D. Martin, 13121 Maugansville Rd., Hagerstown, MD (US) 21740

( * ) Notice: Subject to any disclaimer, the term of this patent is extended or adjusted under 35 U.S.C. 154(b) by 0 days.

(21) Appl. No.: 10/780,810

(22) Filed: Feb. 18, 2004

(51) Int. Cl.
*A01K 1/04* (2006.01)

(52) U.S. Cl. ...................................... 119/791

(58) Field of Classification Search .............. 119/400, 119/406, 700, 703, 771, 786–791, 724, 766, 119/738–759, 769; 384/296
See application file for complete search history.

(56) References Cited

U.S. PATENT DOCUMENTS

| | | | | |
|---|---|---|---|---|
| 778,039 A | * | 12/1904 | Holland | 119/789 |
| 1,849,963 A | * | 3/1932 | Snow | 384/296 |
| 4,854,269 A | * | 8/1989 | Arntzen | 119/703 |
| 5,145,265 A | * | 9/1992 | Flem | 384/296 |
| 5,526,774 A | * | 6/1996 | Swindall et al. | 119/787 |
| 6,408,793 B1 | * | 6/2002 | Rutter | 119/400 |
| 6,578,524 B1 | * | 6/2003 | Rutter | 119/400 |
| 6,662,751 B1 | * | 12/2003 | Rutter | 119/400 |

* cited by examiner

Primary Examiner—Teri Pham Luu
Assistant Examiner—Bret Hayes
(74) Attorney, Agent, or Firm—Neil F. Markva

(57) ABSTRACT

A rigid animal tether assembly comprises a rigid outwardly extending tie section and a rigid, hollow inwardly extending tilt section. The tie section includes tie elements for tethering an animal at a distal end section thereof and being connected at an opposing coupling end section thereof to an open outer end of the tilt section. A base structure includes base surface configuration that contiguously mates with an open inner end of the rigid tilt section. The coupling end section of the rigid tie section includes a biasing member for connecting the coupling end section inside the tilt section for drawing the rigid tie section and rigid, hollow tilt section under tension in a direction towards the base surface configuration. The biasing member is effective to continuously urge the base surface configuration against the open inner end of the tilt section with an amount of force sufficient to project the rigid tie section coupled to the outer end of the tilt section in a direction outwardly from the base surface.

19 Claims, 4 Drawing Sheets

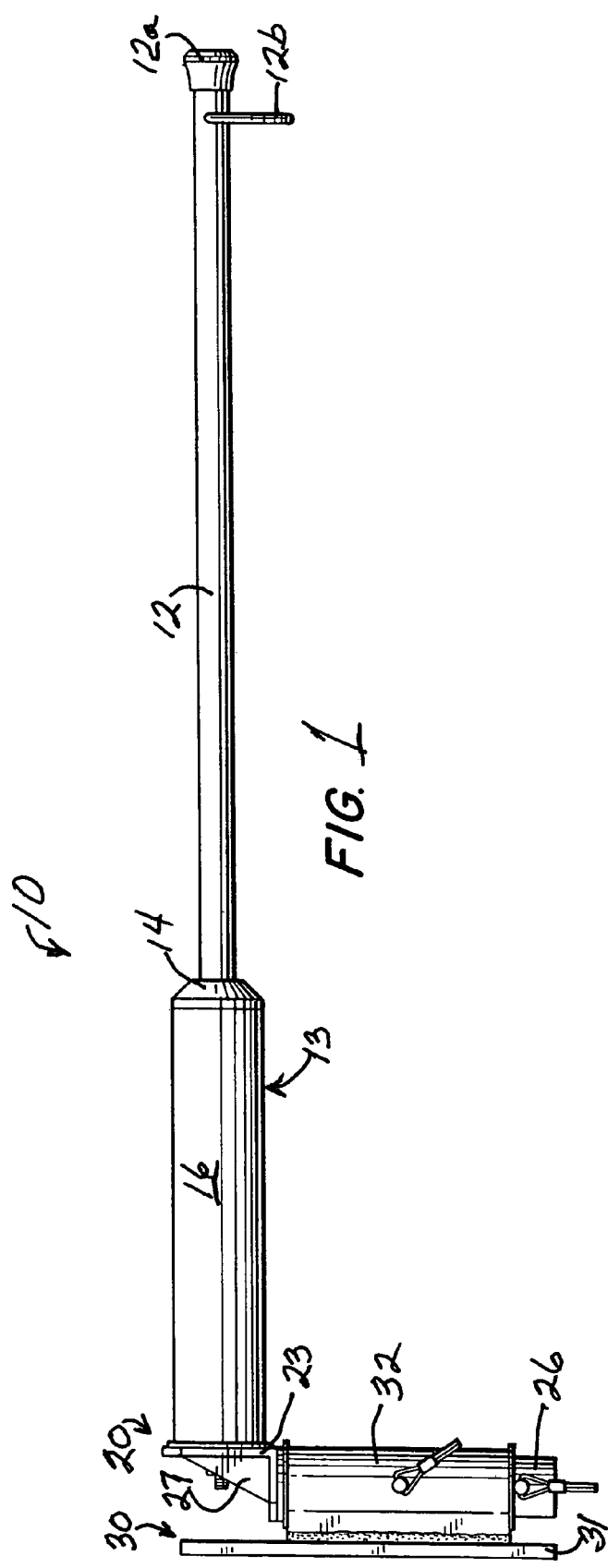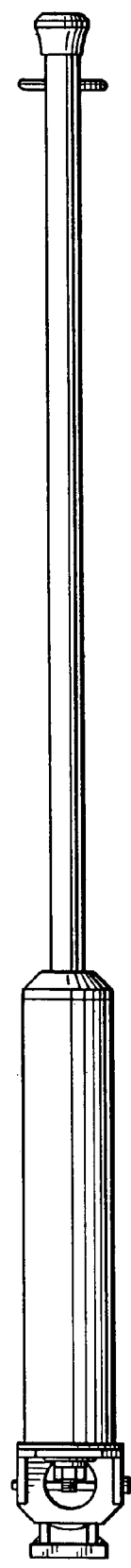

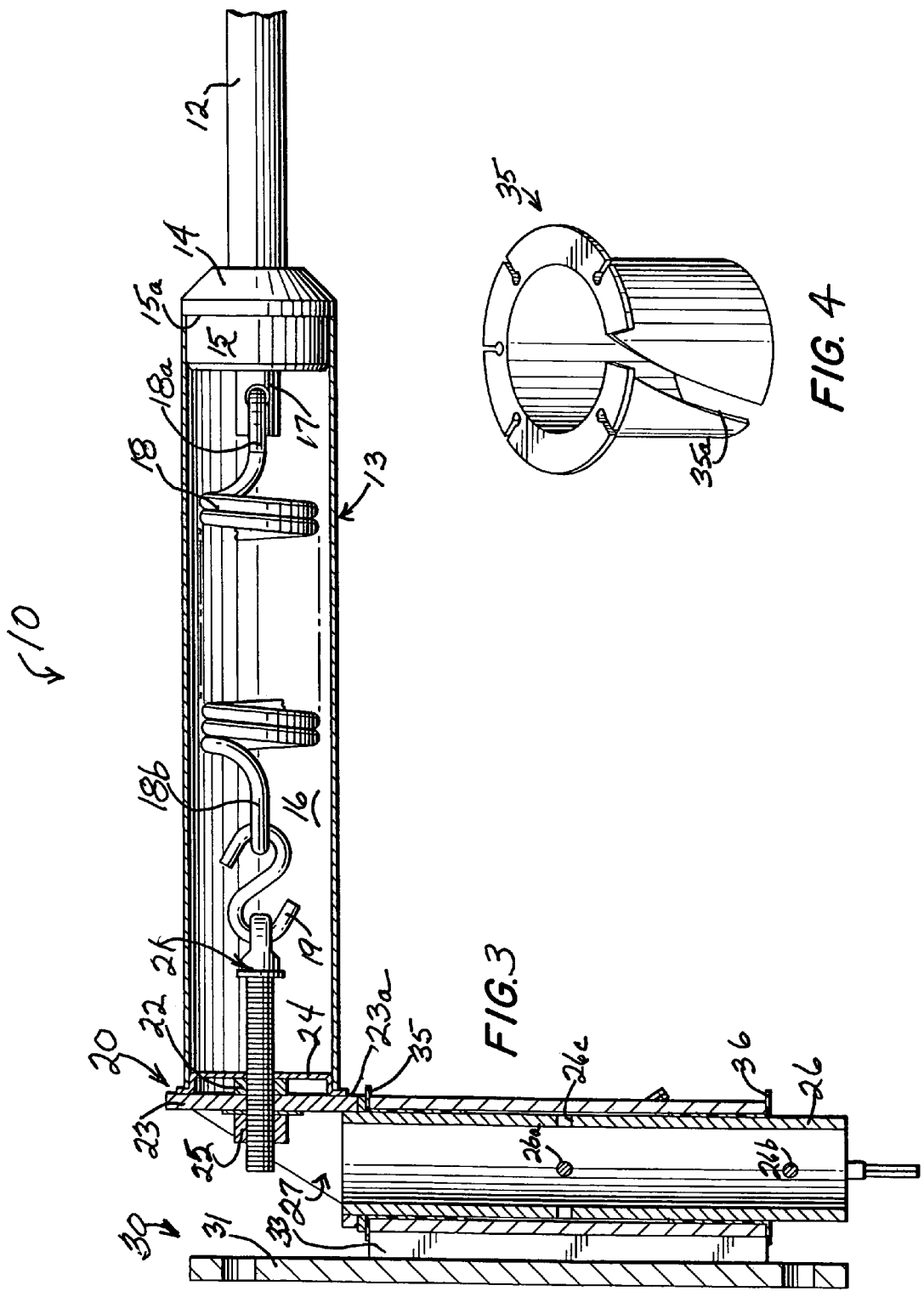

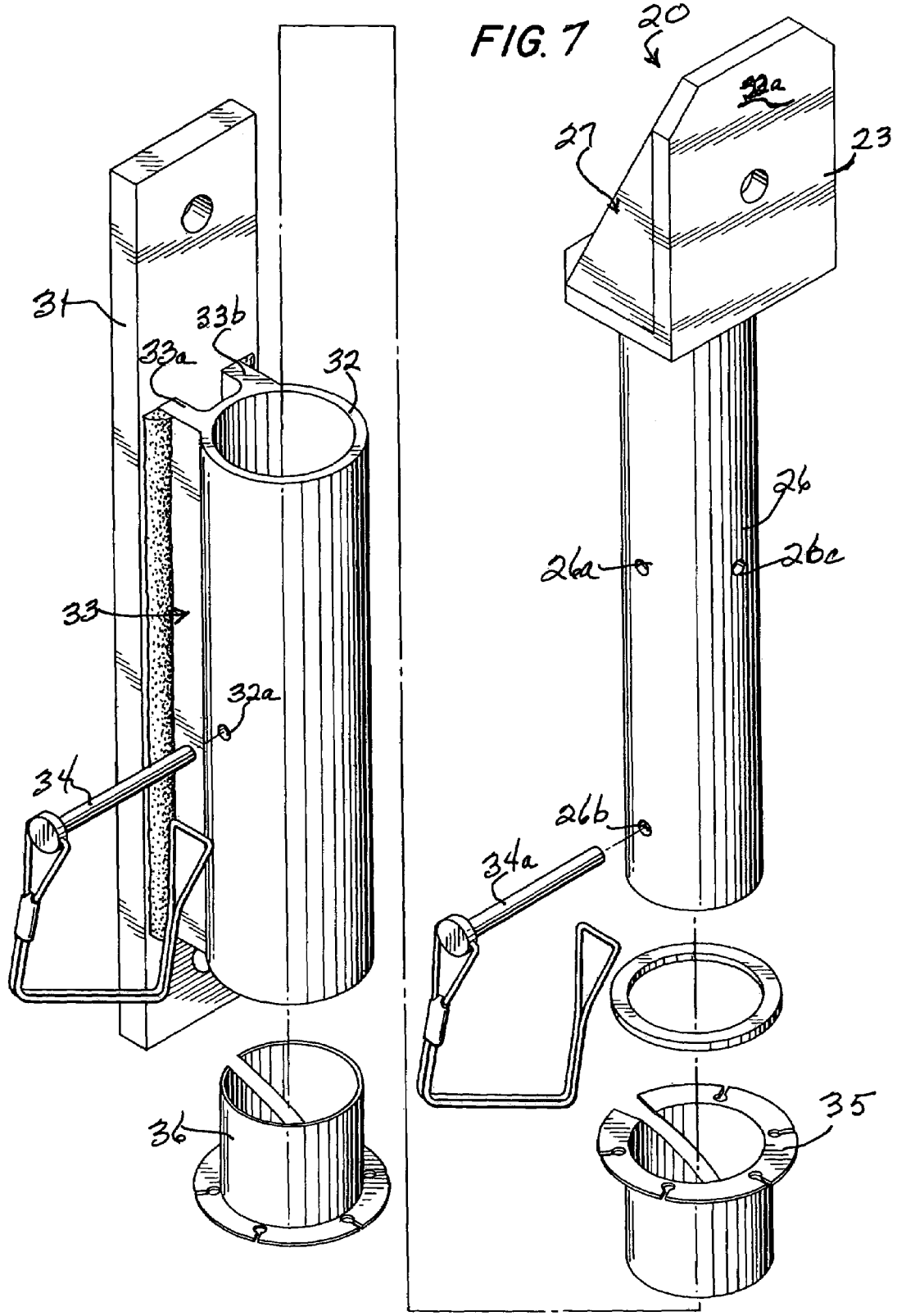

SPRING-LOADED ANIMAL TETHER ASSEMBLY

BACKGROUND OF THE INVENTION

1. Field of the Invention

This invention relates to the field of animal tethering assemblies. More specifically, the invention relates to a rigid animal tethering assembly that is removably attachable to a structure.

2. Description of Prior Art

Animal tethers having an animal tie portion connected to a flexible portion are shown in U.S. Pat. Nos. 67,744; 429,111; 2,481,559; 4,738,222; 4,854,269; 5,526,774; Des. 244,870; and Des. 353,477. Each of these prior art structures includes a spring that forms a flexible portion that is connected to an outwardly extending tie-out portion to which an animal is tethered.

U.S. Pat. Nos. 2,981,230; 3,454,275; and 4,509,462 show various types of tethering assemblies for animals or inanimate objects having a base that removably receives a connector portion to rigidly or rotatably mount the tethering assembly.

U.S. Pat. Nos. 390,808; 2,525,890; 2,713,327; 5,353,747; and 6,612,263 each discloses a tether device having a tie-out portion rotatably mounted to an anchoring mechanism. U.S. Pat. No. 390,808 shows a rotatable bracket in combination with a spring member that enables the tie-out portion to be flexible with respect to the anchoring assembly in virtually all directions. U.S. Pat. No. 2,525,890 shows a tension spring rotatably attached to an anchoring mechanism whereby the spring is expandable to increase tension in the spring when the animal pulls outwardly on the tether. The remaining patents disclose devices having a base that rotatably receives a connector of the tethering device. U.S. Pat. No. 6,612,263 discloses a rotatable connector shaft having a lower section movably mounted within a receiver and an upper portion connected to an outwardly extending tether portion. U.S. Pat. No. 5,353,747 discloses a receiver portion that rotatably holds a connector post that is attached to the tether portion of the disclosed leashing system.

U.S. Pat. Nos. 5,775,264; 6,142,103; 6,571,744 and Des. 269,556 show horse tethering assemblies that may be connected to a trailer or other support structure.

U.S. Pat. Nos. 6,408,793; 6,578,524; and 6,662,751 disclose a flexible, removably detachable tie-out system including a rigid tie-out portion coupled to a flexible or bendable portion that assumes a curved or angular shape when flexed when used. The tie-out system includes a base coupled to a receiver that is adapted to receive a connector. The connector removably couples the receiver to the tie-out. The flexible portion absorbs the pulls and tugs of a horse or other animal, and the damping ability of the flexible portion prevents damage to a trailer, the tie-out, and the animal. The flexible portion allows total universal motion of the tie-out. The tie-out tethering assembly of these patents may be attached to a trailer while traveling, or removed from the trailer and stored separately while traveling. All of the flexible springs have both a quiescent state and a flexed state. None of the disclosed springs are in tension in the quiescent state, and have a particular means for fastening one end of each spring disclosed in each patent to the tie-out portion of the assembly.

None of the available horse ties are spring-loaded and capable of adjusting the spring tension to accommodate various sized animals. Another problem associated with known horse tethering assemblies concerns bothersome rattling noises that occur and may interrupt the sleep of any one who is staying in a trailer to which a known tether assembly is attached. No prior art assembly is designed to quietly and smoothly operate with a tethered animal so as to address this problem. Specific paint and maintenance considerations are particularly associated with the flexible portion of these known tether assemblies. Safety is also a factor when the spring is in a flexed condition and a hand is in contact with the exposed flexible portion.

PURPOSE OF THE INVENTION

A primary object of the invention is to provide a heavy duty spring-loaded animal tether structure to provide a safe place on the trail or away from the ranch to safely tie an animal such as a horse.

Another object of the invention is to provide a tether assembly that may be mounted to the side of a horse trailer and operates quietly and smoothly to enable an uninterrupted sleep of anyone staying inside the trailer while an animal is tethered outside.

A further object of the assembly is to provide an adjustable spring-loaded tether assembly with an amount of tension that can be tailored to the size of the animal and the tethering conditions.

A still further object of the invention is to provide a tether assembly without an exposed flexible portion but allows total universal motion of the tether portion and absorbs the pulls and tugs of an animal while preventing damage to a trailer, the assembly, and the animal.

SUMMARY OF THE INVENTION

The invention is directed to a rigid animal tether assembly comprising a rigid outwardly extending tie portion and a rigid inwardly extending tilt section. The tether portion includes tie means for tethering an animal at a distal end section thereof with a tie section being connected at an opposing coupling end section thereof to an open outer end of the tilt section. Base means includes base surface means for contiguously mating with an open inner end of the rigid tilt section. The coupling end section of the tie section included means for connecting biasing means to the coupling end section inside the tilt section for drawing the rigid tie section under tension in a direction toward the base surface means. The biasing means is effective to urge the base surface means against the open inner end of the tilt section with an amount of force sufficient to project the rigid tie section coupled to the outer end of the tilt section in a direction outwardly from the base surface means. The base means includes base joining means for tiltably uniting the inner end of the tilt section to the base surface means to enable the tie section to tilt together with the tilt section with respect to the base surface means when an animal is tethered to the distal end section of the tie section. The base joining means includes alignment means for registering the tilt section with respect to the base surface means and around the biasing means.

A particular feature of the invention is directed to the alignment means that includes seating means juxtaposed the inner end of the tilt section for positioning the inner open end of the tilt section with respect to the base surface means and the biasing means. The tilt section is thereby effective to tiltably move with respect to the seating means and base surface means. In a specific embodiment, the seating means includes removably mounted cap means having a hub portion directed inwardly into the open inner end of the tilt section and flange means contiguously disposed on the base means around the hub portion against which the inner end of the tilt section is tiltably seated. The distal end section of the tie section includes a resilient end cap member and a movably mounted ring means for releasably attaching an animal tether lead.

Another feature is directed to the coupling end section of the tie section that includes plug means for frictionally fitting the open outer end of the tilt section to link the tie section to the tilt section. The plug means includes shoulder means against which the outer end of the tilt section abuts when frictionally fitted to the plug means, which means includes means for fastening one end of the biasing means to the tie section. And the base joining means includes means for linking the other end of the biasing means to the base surface means.

Another feature of the invention is directed to the coupling end section of the tie section that includes plug means for fixing the open outer end of the tilt section to the coupling end section of the tie section. Biasing means includes a tension-loaded spring member. The plug means includes means for fastening one end of the spring member to the tie section, and the base means includes attachment means for linking the other end of the spring member to the base surface means. The attachment means includes an elongated threaded rod means for connecting the spring member to the base surface means, and tightening means for threadingly engaging the threaded rod means to adjust the amount of tension in the spring member. The base surface means includes a removable cap means for registering the tilt section around the spring member. The cap means is effective to enable the tie section to tilt together with the tilt section with respect to the base surface means when an animal is tether the distal end portion of the tie section. The base surface means includes seating means having an inwardly directed portion disposed within the open inner end of the tilt section. The seating means is effective to allow the tilt section to tilt with respect to the base surface means.

A further feature of the invention is directed to a tether assembly for use with a trailer. The assembly comprises a rigid outwardly extended tie section and a rigid inwardly extending tilt section. The tie section includes means for tethering an animal at a distal section thereof while being connected at an opposing coupling end section thereof to an open outer end of the tilt section. The base means includes assembly support means for mounting the tether assembly to the trailer and base surface means for contiguously mating with an open inner end of the rigid tilt section. The base surface means includes a base connector portion and a support means includes a base receiver portion effective to removably receive the base connector portion for removably attaching the base surface means to a support means.

The coupling end section of the rigid tie section includes means for connecting an outer end of a spring member to the coupling end section inside the tilt section for drawing the rigid tie section under tension in a direction toward the base surface means. The spring means is effective to urge the base surface means against the open inner end of the tilt section with an amount of force sufficient to project the rigid tie section coupled to the outer end of the tilt section in a direction outwardly from the base surface means. The base surface means including base joining means for tiltably uniting the inner end of the tilt section to the base means so that the tie section may tilt together with the tilt section with respect to the base surface means when an animal is tethered to the distal end section of the tie section. The base joining means includes alignment means for registering the hollowing portion with respect to the base surface means and around the spring member that is connected at an inner end thereof to an elongated threaded rod means for releasably connecting the spring member to the base surface means. Tightening means for threadingly engaging the rod means is effective to forcibly draw the tilt section against the base surface means, and to adjust the amount of tension in the spring member. In a specific embodiment the base connector portion includes cylindrical post means for rotatable disposition within the base receiver portion to rotatably mount the base surface means to the assembly support means.

Another feature of the invention is directed to a tether assembly for use with a trailer wherein an outwardly standing tethered portion includes means for tethering an animal at a distal end section thereof and including a cylindrical base connector portion and base support means for mounting the tether assembly to the trailer. The base support means includes a cylindrical base receiver portion effective to removably and rotatably receive the base connector portion for removably attaching the tie section to the support means. Bushing means disposed between the base connector portion and the base receiver portion allows the connector and receiver portion to quietly and smoothly rotate with respect to each other.

In a specific embodiment, the base receiver portion has a first vertical length and the base connector portion has a second vertical length longer than the first vertical length of the receiver portion. The base connector portion length is sufficient to form a downwardly directed end section that projects below the base receiver portion when the base connector portion is disposed within the base receiver portion. The connector end section includes removably mounted means for maintaining and the selective removal of the base connector portion from the base receiver portion.

A further feature of the invention is directed to a base receiver portion having a first vertical length and the base connector portion having a vertical length sufficient to rotate within the base receiver portion when the base connector portion is disposed within the base receiver portion. The base support means includes removably mounted means for selectively precluding rotation and removal of the base connector portion from the base receiver portion. In a specific embodiment the bushing means includes at least one bushing member split generally lengthwise to cylindrically expand and resiliently grasp the cylindrical base connector portion that is rotatably disposed within the base receiver portion. More specifically, the bushing means includes two bushing members each split generally lengthwise to cylindrically expand when disposed on the base connector portion and resiliently grasp the connector portion at each end of the base receiver portion when the connector portion is rotatably disposed within the base receiver portion.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 1 is a side elevational view of a tethering assembly of the invention;

FIG. 2 is a top plan view of the tethering assembly of the invention of FIG. 1;

FIG. 3 is a fragmentary side view in partial cross-section of the tethering assembly of the invention of FIG. 1;

FIG. 4 is a perspective view of a bushing of the invention as shown in use of the assembly of FIG. 3;

FIG. 7 is an exploded perspective view of the attachment assembly of the invention shown in FIGS. 5 and 6.

DETAILED DESCRIPTION

Figure 6:
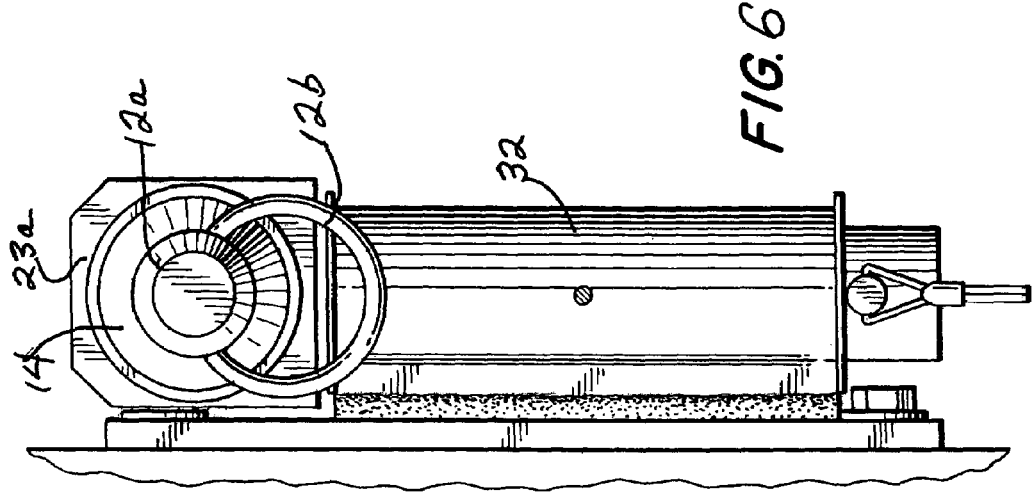
FIG. 6 is a fragmentary side view of an attachment assembly of the invention shown in FIG. 5 with the tie section shown rotated in a direction extending outwardly from the drawing.

Referring to FIGS. 1–3, rigid animal tether assembly, generally designated 10, comprises an animal tie section 12 having an inner end coupled to a rigid tilt section, generally designated 13, that extends outwardly from a base structure, generally designated 20. Tie section 12 includes bolt ring 12b at its distal end with rubber end cap member 12a frictionally disposed over its outer end as shown. Tie section 12 may be a cylindrical solid rod or hollow tube with an animal tether line connected to bolt ring 12b, and cap member 12a provides protection for an animal that might bump against it. Rigid tilt section 13 includes tube portion 16 that extends outwardly from base structure 20 with its outer end connected to an inner coupling end of tie section 12. An outer end segment of tilt section 13 frictionally fits to cylindrical surface 15 of plug 14 with its outer tube end abutting shoulder 15a as shown. In this embodiment, tie section 12 is cylindrical, has an outer diameter of ⅞ inch, and extends outwardly from plug member 14 by about 28 inches. Tube portion 16 is cylindrical; has a length of about 12 inches, and an outer diameter of about 1 and ⅜ inch. So the overall length of tether assembly 10 is about 40 inches.

Base structure 20 includes base member 23 having base surface 23a that contiguously mates with an open inner end of tube portion 16. Base joining assembly includes seating cap member 24 that is removably and contiguously disposed against base surface 23a and has an annular flange disposed around a hub portion having a center opening. Tube portion 16 is movably seated against the annular flange portion and seating member hub portion which is directed into the open inner end of tube portion 16 so that the hub portion center opening is aligned with the longitudinal axis of tube portion 16 as shown. Seating member 24 thus constitutes alignment means juxtaposed the tube portion inner end for positioning it with respect to base surface 23a and registering tube portion 16 around spring member 18. Thus tube portion 16 together with tie section 12 is effective to tiltably move with respect seating member 24 and base surface 23a.

Plug 14 includes inwardly directed connector projection 17 having a transverse bore opening into which outer end section 18a of spring 18 is removably attached. Link member 19 connects inner end spring section 18b to threaded post connector 21 that extends through the center opening of seating cap member 24. Tension adjusting nut 22 threadingly engages threaded post connector 21 for pulling spring member 18 inwardly to draw tie section 12 towards seating cap member 24 and tighten the frictional connection between tie sectionb 12 and tilt section 13. Fastening nut 25 threadingly engages threaded post connector 21 that extends through a bore opening in base member 23 for tightening seating member 24 against base surface 23a with an amount of force sufficient to project the combined tie section 12 and tilt section 13 in a direction outwardly from base surface 23a. Tube portion 16 thus tiltably unites with seating member 24 so that the assembled tie section 12 and tilt section 13 may tilt with respect to seating member 24 and base surface 23a when an animal is tethered to the distal end of tie section 12.

In accord with the invention, spring member 16 is always in a tension loaded state so as to maintain the outward projection of the tether assembly, and the more tension induced into spring 18 with tension adjusting nut 22, the stiffer the tether assembly 10 becomes. The amount of tension may be adjusted in spring member 18 by turning tension adjusting nut 22 clock-wise so that spring member 18 is stretched and the tension within the spring is increased. Fastening nut 25 then attaches the assembly to base member 23 to pull the entire assembly against base surface 23a as shown. The tension in spring member 18 also obviously increases whenever tube portion 16 tilts with respect to base surface 23a so that the distance between base surface 23a and plug member 14 is increased. At no time is spring member 18 in a quiescent state but must always be in a tension-loaded condition for it to serve the multiple function of connecting tie section 12 to base member 23, and at the same time allowing free movement of the animal tethered to any lead attached to bull ring 12b.

As is evident in the drawings and detailed description of this tethering assembly invention, tube portion 16 comprises an inwardly extending rigid, hollow tilt section having an open inner end and an open outer end. Rigid outwardly extending tie section 12 includes means for tethering an animal at a distal end section thereof, and is connected at an opposing coupling end section thereof to the open outer end of tube portion 16. Base surface 23a contiguously mates with respect to the open inner end of rigid, hollow tube portion or tilt section 16, and is held in place with spring-loaded spring member 18 in a manner shown that is effective to continuously urge base surface 23a against the open inner end of tube portion or tilt section 16. Spring member 18 disposed within tube portion or tilt section 16 has an amount of force sufficient to project rigid tie section 12 that is coupled to the outer end of tilt section 16 in a direction outwardly from base surface 23a. Spring member 18 is further effective to allow tilt section 16 to freely tilt with respect to base surface 23a in response to movement of a tethered animal. Spring member 18 is connected to the opposing coupling end section inside hollow tube portion or tilt section 16 for continuously drawing rigid tie section 12 and tilt section 16 under tension in a direction toward base surface 23a.

Another feature of the invention includes assembly support base 30 for removably mounting tether assembly 10 to the side of a structure such as a horse trailer. Base structure 20 includes a bracket 27 that includes assembly base member 23 and is fixedly mounted to cylindrical connector 26. Support base 30 includes receiver 32 having leg section 33 with two elongated leg members 33a and 33b welded to mounting base plate 31 as shown in FIG. 7. Base plate 31 includes bore openings at either end as shown to receive a pair of lag bolts for mounting support base 30 to the side of a trailer. Receiver 32 is effective to removably receive connector 26 for removably attaching assembly base structure 20 to assembly support base 30. Receiver 32 has a first vertical length and connector 26 has a second vertical length longer than the first vertical length that forms a downwardly directed end section that projects below receiver 32 as shown in FIG. 3 when connector 26 is disposed within base receiver 32. Tubular connector 26 includes an upper pair of openings 26a and a lower pair of openings all having axes disposed perpendicular to the longitudinal axis of connector 26. A second upper pair of openings 26c have axes disposed perpendicular to the longitudinal axis of connector 26 and the axes of openings 26a as shown in FIG. 7.

Figure 5:
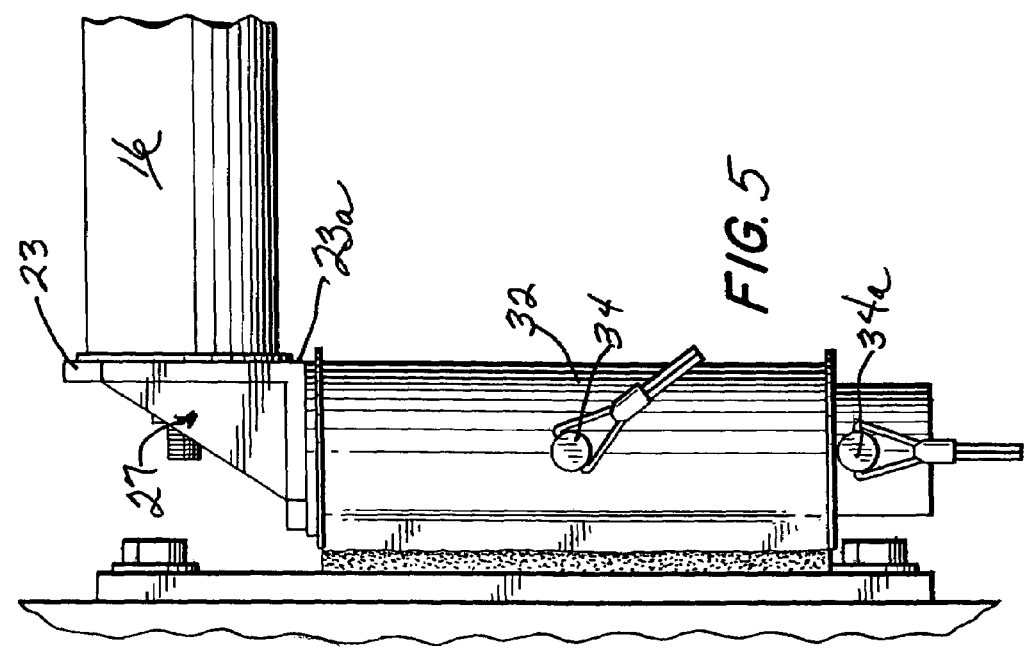
FIG. 5 is a fragmentary side view of an attachment assembly of the invention fixed to a structure.

Receiver 32 includes a pair of openings 32a that are aligned with the pair of openings 26a of connector 26 so that removably mounted pin 34 may be placed through both connector 26 and receiver 32 when joined together. This precludes rotation of connector 26 which is maintained in place within receiver 32. To rotate tether assembly 10 to its position shown in FIG. 6, pin 34 is removed and connector 26 rotated 90 degrees. Pin 34 is then placed through the two pairs of openings 32a of receiver 32 and openings 26c of connector 26 to fix the disposition of tether assembly 10 in place. FIGS. 1–3 and 7 show tether assembly 10 with connector 26 in position with its openings 26a aligned with receiver openings 32a of receiver 32. Pin 34 is shown in place to preclude rotation and removal of connector 26 from the receiver 32. The outwardly and downwardly directed end section of connector 26 includes a pair of openings 26b on either side of the tube configuration so that pin 34a can be disposed therein once connector 26 is fully disposed in receiver 32 to preclude removal of connector 26 from receiver 32 as shown in FIG. 5.

Bushing 35 (FIGS. 4 and 5) has a split configuration 35a extending generally lengthwise to cylindrically expand and resiliently grasp connector 26 that is rotatably disposed within receiver 32. In this embodiment, two bushing members 35 and 36 are disposed on connector 26 at opposite ends of receiver 32. Bushing members 35 and 36 are identical and composed of flexible plastic materials so that they both resiliently grasp connector 26 at each end of receiver 32 to enable the quiet and smooth rotation and disposition of connector 26 disposed within receiver 32.

While the invention has been particularly shown and described with reference to a specific embodiment thereof, together with numerous characteristics and advantages of the invention and details of the structure and function of the invention, it will be understood by those skilled in the art that various changes in form and details, and especially in the matters of shape, size and arrangement of parts, may be made therein to the full extent indicated by the broad general meaning of the terms in which the appended claims are expressed, and without departing from the spirit and scope of the invention.

What is claimed is:

1. A rigid animal tether assembly comprising:
   a) a rigid outwardly extending tie section and an inwardly extending rigid, hollow tilt section having an open inner end, said tie section including means for tethering an animal at a distal end section thereof and being connected at an opposing coupling end section thereof to an open outer end of said tilt section; and
   b) base surface means for contiguously mating with said open inner end of the rigid, hollow tilt section;
   c) said coupling end section of the rigid tie section including means for connecting biasing means to said opposing coupling end section inside said hollow tilt section for continuously drawing the rigid tie section and rigid, hollow tilt section under tension in a direction toward said base surface means;
   d) said biasing means being disposed within said rigid, hollow tilt section for continuously urging said base surface means against said open inner end of the tilt section with an amount of force sufficient to project the rigid tie section coupled to the outer end of the tilt section in a direction outwardly from said base surface means, said biasing means being further effective to allow the tilt section to tilt in response to movement of a tethered animal.

2. A tether assembly as defined in claim 1, wherein said base surface means includes means for tiltably uniting the inner end of the hollow tilt section to the base surface means to enable the tie section to tilt together with the tilt section with respect to the base surface means when an animal is tethered to said distal end section of the tie section.

3. A tether assembly as defined in claim 2, wherein said base surface means includes alignment means for registering the hollow tilt section with respect to the base surface means to surround the biasing means.

4. A tether assembly as defined in claim 3, wherein said alignment means includes means juxtaposed the inner end of the hollow tilt section for positioning the inner open end of the tilt section with respect to the base surface means and the biasing means, said hollow tilt section being effective to tiltably move with respect to the base surface means.

5. A tether assembly as defined in claim 4, wherein said means juxtaposed the inner end of the hollow tilt section includes a removably mounted cap member having a hub portion directed inwardly into the open inner end of the tilt section with a flange contiguously disposed on the base surface means around said hub portion against which the open inner end of the tilt section is tiltably seated.

6. A tether assembly as defined in claim 1, wherein said distal end section of the tie section includes a resilient end cap member and a movably mounted ring for releasably attaching an animal tether lead.

7. A tether assembly as defined in claim 1, wherein said coupling end section of the tie section includes a plug member for frictionally fitting the open outer end of the tilt section to link the tie section to the tilt section.

8. A tether assembly as defined in claim 7, wherein said plug member includes a shoulder against which the outer end of the tilt section abuts when frictionally fitted to the plug member.

9. A tether assembly as defined in claim 7, wherein said plug member includes means for fastening one end of the biasing means to said tie section, and said base surface means is joined to means for linking the other end of the biasing means to the base surface means.

10. A tether assembly as defined in claim 1, wherein said coupling end section of the tie section includes means for fixing the open outer end of the tilt section to said coupling end section of the tie section,
said biasing means includes a tension-loaded spring member,
said means for fixing the open outer end of the tilt section to said coupling end section includes means for fastening one end of the spring member to said tie section, and said base surface means includes means for linking the other end of the spring member to the base surface means.

11. A tether assembly as defined in claim 10, wherein said means for linking the other end of the spring member to the base surface means includes an elongated threaded rod for connecting said other end of the spring member to the base surface means having a threaded hole for threadingly engaging the threaded rod to adjust the amount of tension in the spring member.

12. A tether assembly as defined in claim 10, wherein
said base surface means includes a removable cap member for registering the hollow tilt section around the spring member, said cap member having a hub portion directed into said hollow tilt section and being effective to enable the tie section to tilt together with the tilt section with respect to the base surface means when an animal is tethered to said distal end section of the tie section.

13. A tether assembly as defined in claim 10, wherein
said base surface means having an inwardly directed portion for disposition within the open inner end of the tilt section,
said inwardly directed portion being effective to allow said tilt section to tilt with respect to the base surface means.

14. A tether assembly for use with a trailer, said assembly comprising:
a) a rigid outwardly extending tie section and an inwardly extending rigid, hollow tilt section having an open inner end and an open outer end, said tie section including means for tethering an animal at a distal end section thereof and said tie section being connected at an opposing coupling end section thereof to said open outer end of said tilt section;
b) base surface means for contiguously mating with said open inner end of the rigid, hollow tilt section; and
c) assembly support means for mounting the tether assembly to said trailer, and connector means for removably attaching the base surface means to said assembly support means,
d) said assembly support means including receiver means for removably receiving said connector means;
e) said opposing coupling end section of the rigid tie section including means for connecting an outer end of a spring member to said coupling end section inside said hollow tilt section for continuously drawing the rigid tie section under tension in a direction towards said base surface means;
f) said spring member being effective to continuously urge said base surface means against the open inner end of the hollow tilt section with an amount of force sufficient to project the rigid tie section coupled to the outer end of the tilt section in a direction outwardly from said base surface means;
g) said base surface means including means for tiltably uniting the inner end of the tilt section to the base surface means so that the tie section may tilt together with the tilt section with respect to the base surface means when an animal is tethered to said distal end section of the tie section;
h) said base surface means including alignment means for registering the hollow tilt section with respect to the base surface means to surround the spring member;
i) said spring member being connected at an inner end thereof to an elongated threaded rod for releasably connecting the spring member to said base surface means, and
j) said base surface means having a threaded hole for threadingly engaging said threaded rod means is so as to be effective to forcibly draw the tilt section against the base surface means and to adjust the amount of tension in the spring member.

15. A tether assembly as defined in claim 14, wherein
said connector means includes cylindrical means for rotatable disposition within said receiver means to rotatably mount the base surface means to the assembly support means.

16. A tether assembly for use with a trailer, said assembly comprising:
a) an outwardly extending tie section including means for tethering an animal at a distal end section thereof and a cylindrical connector portion at an inner end thereof;
b) support means for mounting the tether assembly to said trailer;
c) said support means including a cylindrical receiver portion effective to removably and rotatably receive said connector portion for removably attaching the tie section to said support means; and
d) bushing means disposed between the connector portion and the receiver portion for allowing said connector and receiver portions to quietly and smoothly rotate with respect to each other;
(e) said bushing means includes at least one bushing member split generally lengthwise to cylindrically expand and resiliently grasp the cylindrical connector portion that is rotatable disposed within said receiver portion.

17. A tether assembly as defined in claim 16, wherein
said receiver portion has a first vertical length and said connector portion has a second vertical length longer than said first vertical length that forms a downwardly directed connector end section that projects below said receiver portion when the connector portion is disposed within said receiver portion,
said connector end portion includes removably mounted means for maintaining the connector portion within the receiver portion and the selective removal of the connector portion from the receiver portion.

18. A tether assembly as defined in claim 16, wherein
said receiver portion has a first vertical length and said connector portion has a vertical length sufficient to rotate within said receiver portion when the connector portion is disposed within said receiver portion,
said assembly support means includes removably mounted means for selectively precluding rotation and removal of the connector portion from the receiver portion.

19. A tether assembly as defined in claim 16, wherein
said bushing means includes two bushing members each split generally lengthwise to cylindrically expand when disposed on said connector portion and resiliently grasp the connector portion at each end of the receiver portion when the connector portion is rotatably disposed within said receiver portion.

* * * * *